(12) United States Patent
Liu et al.

(10) Patent No.: US 12,013,560 B2
(45) Date of Patent: Jun. 18, 2024

(54) POLARIZER, ELECTRONIC DEVICE AND PREPARATION METHOD FOR POLARIZER

(71) Applicants: Kunshan New Flat Panel Display Technology Center Co., Ltd., Jiangsu (CN); KunShan Go-Visionox Opto-Electronics Co., Ltd., Jiangsu (CN)

(72) Inventors: Renjie Liu, Kunshan (CN); Gang Chen, Kunshan (CN); Gusheng Xu, Kunshan (CN); Lingyan Chen, Kunshan (CN); Hang Zhang, Kunshan (CN)

(73) Assignees: Kunshan New Flat Panel Display Technology Center Co., Ltd., Kunshan (CN); KunShan Go-Visionox Opto-Electronics Co., Ltd., Kunshan (CN)

( * ) Notice: Subject to any disclaimer, the term of this patent is extended or adjusted under 35 U.S.C. 154(b) by 489 days.

(21) Appl. No.: 17/390,040

(22) Filed: Jul. 30, 2021

(65) Prior Publication Data

US 2021/0356641 A1 Nov. 18, 2021

Related U.S. Application Data

(63) Continuation of application No. PCT/CN2020/077035, filed on Feb. 27, 2020.

(30) Foreign Application Priority Data

Jun. 24, 2019 (CN) .......................... 201910550663.3

(51) Int. Cl.
*G02B 5/30* (2006.01)

(52) U.S. Cl.
CPC ......... *G02B 5/3083* (2013.01); *G02B 5/3041* (2013.01)

(58) Field of Classification Search
None
See application file for complete search history.

(56) References Cited

U.S. PATENT DOCUMENTS

2014/0118826 A1* 5/2014 Jiao ...................... G02B 5/3041
156/99

FOREIGN PATENT DOCUMENTS

| CN | 101840013 A | 9/2010 |
|---|---|---|
| CN | 104656180 A | 5/2015 |

(Continued)

OTHER PUBLICATIONS

Chinese First Office Action issued on May 6, 2020 in corresponding Chinese Application No. 201910550663.3; 19 pages.

(Continued)

*Primary Examiner* — Robert E. Tallman
(74) *Attorney, Agent, or Firm* — Maier & Maier, PLLC

(57) ABSTRACT

A polarizer, an electronic device and a preparation method for the polarizer are provided, the polarizer including: a base film, having a side surface and defining a first region and a second region surrounding the first region on the side surface; a linear polarizing film, arranged on the side surface of the base film and covering the second region; a transparent filler, arranged in a same layer with the linear polarizing film and covering the first region; and a retardation film, covering a side of the linear polarizing film and a side of the transparent filler away from the base film.

18 Claims, 3 Drawing Sheets

(56) References Cited

FOREIGN PATENT DOCUMENTS

| | | | |
|---|---|---|---|
| CN | 106095156 A | 11/2016 |
| CN | 206489586 U | 9/2017 |
| CN | 105474055 B | 9/2018 |
| CN | 108873428 A | 11/2018 |
| CN | 208210033 U | 12/2018 |
| CN | 109194787 A | 1/2019 |
| CN | 208572161 U | 3/2019 |
| CN | 109637378 A | 4/2019 |
| CN | 109733034 A | 5/2019 |
| CN | 109782461 A | 5/2019 |
| CN | 110187427 A | 8/2019 |
| JP | 4468032 B2 | 5/2010 |
| TW | 201706640 A | 2/2017 |
| WO | 2019047126 A1 | 3/2019 |

OTHER PUBLICATIONS

Chinese Second Office Action issued on Nov. 13, 2020 in corresponding Chinese Application No. 201910550663.3; 18 pages.
Notification to Grant Patent Right for Invention issued on Mar. 15, 2021 in corresponding Chinese Application No. 201910550663.3; 6 pages.
International Search Report and Written Opinion issued on May 18, 2020 in corresponding International Application No. PCT/CN2020/077035; 16 pages.
Taiwanese First Office Action issued on Dec. 22, 2020 in corresponding Taiwanese Application No. 109107496; 14 pages.
Taiwanese Patent approval issued on Mar. 26, 2021 in corresponding Taiwanese Application No. 109107496; 4 pages.

* cited by examiner

POLARIZER, ELECTRONIC DEVICE AND PREPARATION METHOD FOR POLARIZER

CROSS REFERENCE

The present application is a continuation-application of International (PCT) Patent Application No. PCT/CN2020/077035, filed on Feb. 27, 2020, which claims foreign priority of Chinese Patent Application No. 201910550663.3, filed on Jun. 24, 2019, in the National Intellectual Property Administration of China, the entire contents of which are hereby incorporated by reference in its entirety.

TECHNICAL FIELD

The present disclosure relates to the technical field of electronic devices, and in particular to a polarizer, an electronic device and a preparation method for the polarizer.

BACKGROUND

At present, electronic devices (such as, mobile phones, tablets, TVs, etc.) have higher and higher requirements for the utilization of screen frames. To achieve a comprehensive screen effect, a concept of a screen camera has emerged.

To reduce the reflection of a metal layer of the electronic device to the ambient light, it is generally necessary to arrange a polarizer on the screen to reduce the reflection of the metal layer to the ambient light and improve the contrast of the electronic device under strong light.

However, the polarizer will cause a low transmittance of the camera arranged on one side of the screen. Therefore, the polarizer corresponding to the position of the camera is usually grooved to form a depolarized region.

However, the above-mentioned method of forming the depolarized region is relatively cumbersome. Moreover, when the polarizer is attached to a cover plate in the later stage, an optical clear adhesive (OCA) cannot completely fill a disconnection defined by the groove in the polarizer, which will cause optical problems and may cause dust to accumulate in this recessed region.

SUMMARY OF THE DISCLOSURE

The present disclosure provides a polarizer, an electronic device and a preparation method for the polarizer, which can relatively simply form a depolarized region.

The present disclosure provides a polarizer, including: a base film, having a side surface and defining a first region and a second region surrounding the first region on the side surface; a linear polarizing film, arranged on the side surface of the base film and covering the second region; a transparent filler, arranged in a same layer with the linear polarizing film and covering the first region; and a retardation film, covering a side of the linear polarizing film and a side of the transparent filler away from the base film.

The present disclosure further provides an electronic device, including: a display layer; a retardation film, arranged on a side of the display layer; a linear polarizing film, arranged on a side of the retardation film away from the display layer and defining an opening; a transparent filler, arranged in the opening; and an optical device, arranged on a side of the display layer opposite to the retardation film, a photosensitive region of the optical device corresponding to the opening.

The present disclosure further provides a method for preparing a polarizer, including: providing a base film having a side surface and defining a first region and a second region surrounding the first region on the side surface; forming a linear polarizing film, a transparent filler and a retardation film on a side of the base film; and arranging the linear polarizing film on the side surface of the base film and covering the second region; arranging the transparent filler in a same layer with the linear polarizing film and covers the first region; and covering the retardation film on a side of the linear polarizing film and of the transparent filler away from the base film.

DETAILED DESCRIPTION

The following is a clear and complete description of the technical solutions in the embodiments of the present disclosure in conjunction with the accompanying drawings. Obviously, the described embodiments are only a part of the embodiments of the present disclosure, but not all of them. Based on the embodiments in the present disclosure, all other embodiments obtained by those skilled in the art without making creative labor fall within the scope of the present disclosure.

Figure 1:
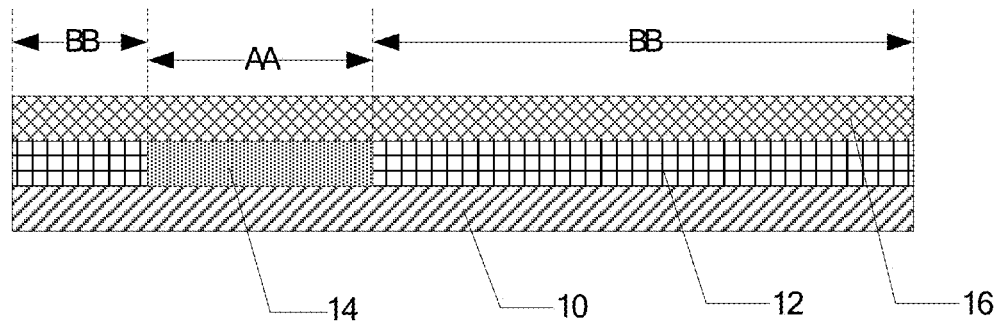
FIG. 1 is a structural schematic view of a polarizer according to an embodiment of the present disclosure.
Figure 2:
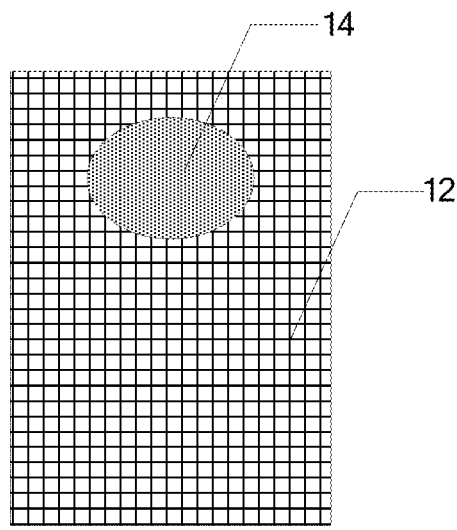
FIG. 2 is a top view of an embodiment of the transparent filler and the linear polarizing film shown in FIG. 1.

Referring to FIG. 1 to FIG. 2, the polarizer includes a base film 10, a linear polarizing film 12, a transparent filler 14 and a retardation film 16.

Specifically, a first region AA and a second region BB surrounding the first region AA are defined on a side surface of the base film 10. The shape of the first region AA may be substantially a regular pattern, for example, a circle, an ellipse, a rectangle, etc. Of course, the shape of the first region AA may also be an irregular pattern. The base film 10 may be a triacetate cellulose (TAC) film or the like. When the base film 10 is arranged on a side of the linear polarizing film 12, the erosion of the linear polarizing film 12 by external water vapor may be reduced. The linear polarizing film 12 is arranged on the side surface of the base film 10 and covers the second region BB but not the first region AA. In this case, the linear polarizing film 12 defines an opening corresponding to the first region AA. The transparent filler 14 is arranged in a same layer as the linear polarizing film 12 and covers the first region AA, that is, the transparent filler 14 fills the opening defined by the linear polarizing film 12. In the embodiment, the transparent filler 14 does not have a linear deflection effect. The height of the transparent filler 14 may be level with the height of the linear polarizing film 12, such that non-disconnection may be realized. The retardation film 16 covers a side of the linear polarizing film 12 and the transparent filler 14 away from the base film 10.

The retardation film 16 may include a ¼ wavelength retardation layer or a ½ wavelength retardation layer.

Since the linear polarizing film 12 does not cover the first region AA, the position of the polarizer corresponding to the first region AA thus forms a depolarized region. Compared with the technical solution of the entire grooving process on the polarizer, the method of the present disclosure has a simple structure and is easy to implement. Moreover, the transparent filler 14 is applied to fill the opening of the linear polarizing film 12 (that is, the first region AA that is not covered by the linear polarizing film 12), the final polarizer surface may be made relatively flat and with no abnormal shape. When the polarizer is attached to the cover plate, etc., the problem of disconnection filling such as the need for optical glue may be avoided, the display quality is improved, and the probability of dust accumulation is reduced.

In some embodiments, the surface of the first region AA is hydrophobic, and the surface of the second region BB is hydrophilic, such that the linear polarizing film 12 only covers the second region BB. When the linear polarizing film 12 is formed by coating a linearly polarizing material, since the surface of the first region AA is hydrophobic, the linearly polarizing material cannot cover the surface of the first region AA, and thus the linearly polarizing film 12 cannot be arranged on the surface of the first region AA. In this way, this design enables the method of forming the linear polarizing film 12 with the open to be simple.

Figure 3:
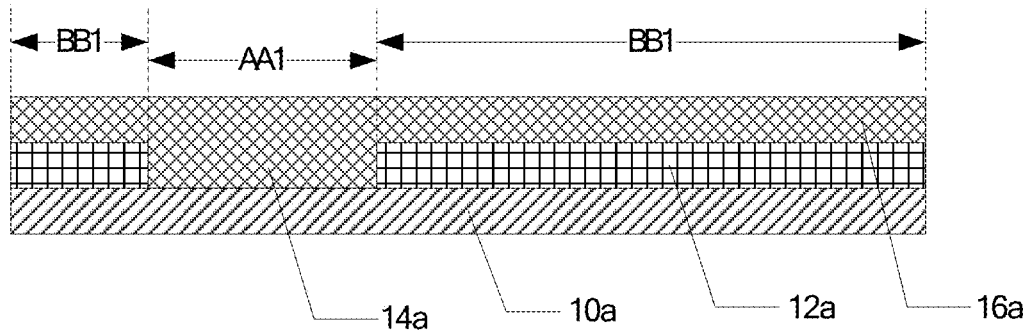
FIG. 3 is a structural schematic view of an embodiment in which the transparent filler and the retardation film in the polarizer shown in FIG. 1 are made of a same material.

As shown in FIG. 3, the transparent filler 14*a* and the retardation film 16*a* are made of a same material. For example, on the basis of the above-mentioned embodiments, the linear polarizing film 12*a* is coated with a layer of retardation material on a side away from the base film 10*a*. The retardation material extending into the opening of the linear polarizing film 12*a* forms a transparent filler 14*a*. The retardation material covering the side of the linear polarizing film 12*a* and the transparent filler 14*a* away from the base film 10*a* forms a retardation film. The transparent filler 14*a* and the retardation film 16*a* may be formed in a same process. This design may enable method of forming the transparent filler 14*a* and the retardation film 16*a* to be simpler and more efficient. Of course, in other embodiments, the materials of the transparent filler 14*a* and the retardation film 16*a* may also be different. In this case, the two may be formed sequentially.

Referring to FIG. 1 or FIG. 3 again, a contact angle of the side surface of the base film at the first region AA/AA1 is substantially 100°-120°, such that the transparent filler 14/14*a* is connected to the base film 10/10*a* of the first region AA/AA1. In the embodiments, the original hydrophobic surface of the first region AA/AA1 may be treated by corona, plasma, etc., such that the contact angle is 100°-120° (for example, 100°, 110°, 120°, etc.), thereby improving the surface adhesion of the first region AA/AA1. In this way, the subsequently-formed transparent filler 14/14*a* may be connected to the base film 10/10*a* of the first region AA/AA1.

In some embodiments, to improve the surface adhesion of the first region AA/AA1, the surface of the first region AA/AA1 may also be surface treated with an adhesive, such as a silicone pressure-sensitive adhesive, an epoxy resin, a glass adhesive, etc., The transparent filler 14/14*a* is connected to the base film 10/10*a* of the first region AA/AA1 through the adhesive. Of course, the adhesive may also be configured as the transparent filler 14/14*a*, and then the retardation film 16 covering the transparent filler 14/14*a* and the linear polarizing film 12 may be formed.

The above-mentioned polarizer may also include other structures, for example, an anti-interference layer located between the linear polarizing film 12 and the retardation film 16. In this case, the transparent filler 14 and the anti-interference layer may be made of a same material.

The polarizer provided in the present disclosure will be further described from the perspective of the preparation method.

Combined with FIG. 1, the preparation method of the polarizer provided by the present disclosure includes: forming a linear polarizing film 12, a transparent filler 14 and a retardation film 16 on a side of the base film 10. A first region AA and a second region BB surrounding the first region AA are defined on a side surface of the base film 10. The linear polarizing film 12 is arranged on the side surface of the base film 10 and covers the second region BB. The transparent filler 14 is arranged in a same layer as the linear polarizing film 12 and covers the first region AA. The retardation film 16 covers a side of the linear polarizing film 12 and the transparent filler 14 away from the base film 10.

Figure 4:
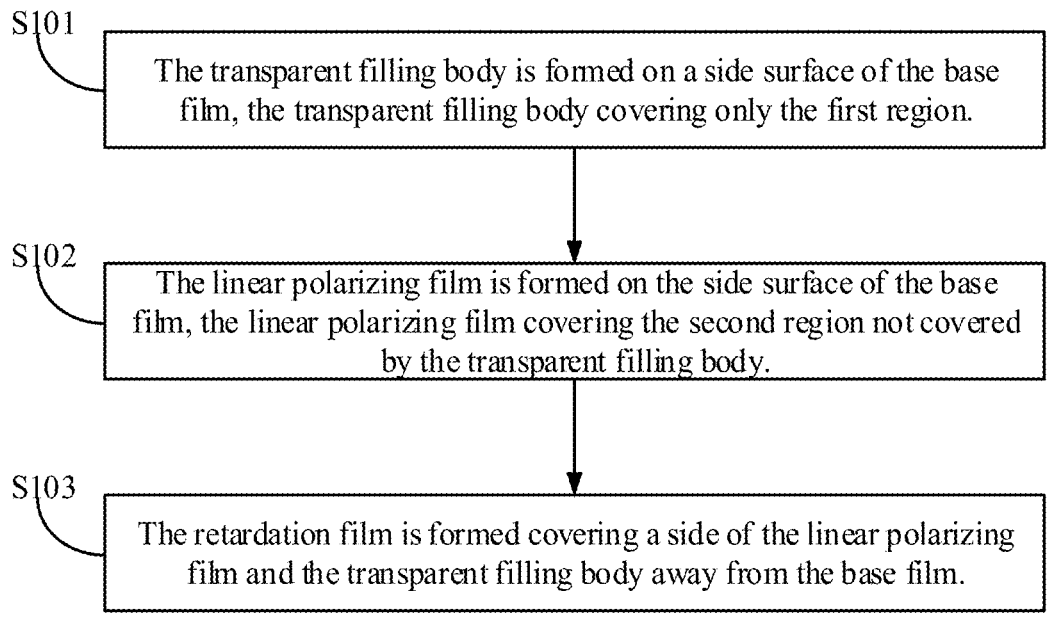
FIG. 4 is a flow chart of a preparation method for a polarizer according to an embodiment of the present disclosure.

In the case that the structure of the polarizer is as shown in FIG. 1, referring to FIG. 4 which is a flow chart of a preparation method for a polarizer according to an embodiment of the present disclosure, the forming the linear polarizing film 12, the transparent filler 14 and the retardation film 16 on a side of the base film 10 specifically includes operations at blocks as followed.

At block S101: forming the transparent filler 14 on a side surface of the base film 10 to cover only the first region AA.

At block S102: forming the linear polarizing film 12 on the side surface of the base film 10 to cover the second region BB not covered by the transparent filler 14.

At block S103: forming the retardation film 16 to cover a side of the linear polarizing film 12 and the transparent filler 14 away from the base film 10.

In the case that the structure of the polarizer is as shown in FIG. 3, before the forming the linear polarizing film 12*a*, the transparent filler 14*a* and the retardation film 16*a* on a side of the base film 10*a*, the preparation method provided by the present disclosure also includes: surface treating the side surface of the base film 10*a* such that the surface of the first region AA1 of the base film 10*a* has hydrophobicity, and the surface of the second region BB1 of the base film 10*a* has hydrophilicity. For example, when the base film 10*a* is a TAC film, the original surface of the base film 10*a* is a hydrophobic interface. A blocking member may be arranged to block the first region AA1 on the base film 10*a*, and then the second region BB1 of the base film 10*a* is processed with a lye saponification treatment, a pure water cleaning treatment, and drying in sequence. In this way, the surface of the second region BB1 is a hydrophilic interface.

Figure 5:
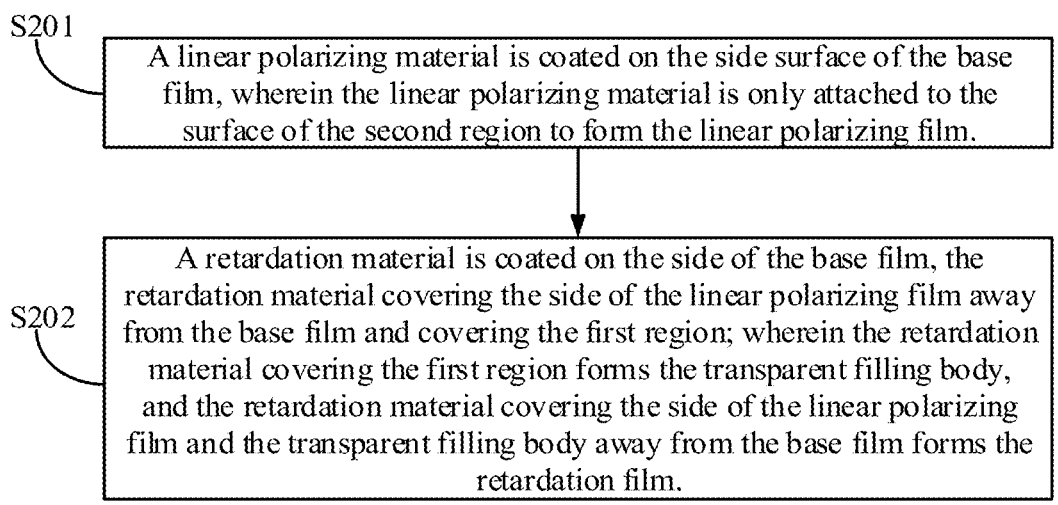
FIG. 5 is a flow chart of an embodiment of a preparation method for the polarizer shown in FIG. 3.

Further, referring to FIG. 5, the forming the linear polarizing film 12*a*, the transparent filler 14*a* and the retardation film 16*a* on a side of the base film 10*a* specifically includes operations at blocks as followed.

At block S201: coating a linear polarizing material on the side surface of the base film 10*a*, wherein the linear polarizing material is only attached to the surface of the second region BB1 to form the linear polarizing film 12*a*.

At block S202: coating a retardation material on the side of the base film 10*a* to cover the side of the linear polarizing film 12*a* and the transparent filler 14*a* away from the base film 10*a* to form the retardation film 16*a* and covering the first region AA1 to form the transparent filler 14*a*. In addition, in the embodiment, to improve the surface adhesion between the transparent filler 14*a* and the surface of the first region AA1, the surface of the first region AA1 may be treated before the above operation S202, such that the contact angle of the side surface of the base film at the first region AA1 is 100°-120°. For example, corona or plasma treatment methods may be applied. Alternatively, a layer of adhesive may be coated on the surface of the first region AA1 before the operation S202.

Figure 6:
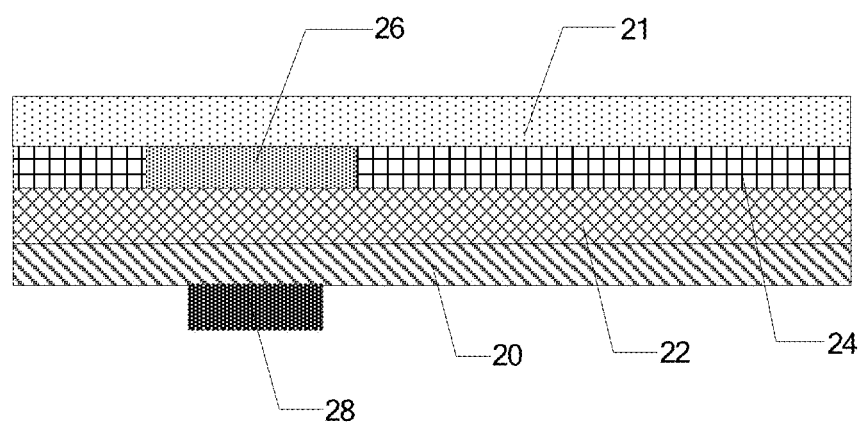
FIG. 6 is a structural schematic view of an electronic device according to an embodiment of the present disclosure.

Referring to FIG. 6, FIG. 6 is a structural schematic view of an electronic device according to an embodiment of the present disclosure. The electronic device includes a display layer 20, a retardation film 22, a linear polarizing film 24, a transparent filler 26, and an optical device 28.

Specifically, the display layer 20 may include a laminated substrate, a thin film transistor layer, a light emitting layer, a touch control layer, and the like. The retardation film 22 is arranged on a side of the display layer 20. For example, the retardation film 22 may be arranged on the side with a touch layer. The retardation film 22 may include at least one of a ¼ wavelength retardation layer and a ½ wavelength retardation layer. The linear polarizing film 24 is arranged on a side of the retardation film 22 away from the display layer 20, and defines an opening. The transparent filler 26 is arranged in the opening. The optical device 28 may be a camera, an under-screen fingerprint sensor, a distance sensor, etc. The optical device 28 is arranged on a side of the display layer 20 opposite to the phase difference film 22. A photosensitive region of the optical device 28 corresponds to the opening. Of course, in other embodiments, the electronic device may further include a cover plate 21 arranged on the side of the linear polarizing film 24 away from the display layer 20. In other embodiments, the electronic device may further include a base film arranged between the linear polarizing film 24 and the cover 21.

Since the linear polarizing film 24 defines the opening, and the opening is filled with the transparent filler 26 that does not have a linear polarizing function, a position corresponding to the opening of the linear polarizing film 24 thus forms a depolarized region. Compared with the technical solution of the entire grooving process on the polarizer, the method of the present disclosure has a simple structure and is easy to implement. Moreover, the transparent filler 14 is applied to fill the opening of the linear polarizing film 12 (that is, the first region AA that is not covered by the linear polarizing film 12), the final polarizer surface may be made relatively flat and with no abnormal shape. When the polarizer is attached to the cover plate, etc., the problem of disconnection filling such as the need for optical glue may be avoided, the display quality is improved, and the probability of dust accumulation is reduced.

In addition, in the embodiment, the retardation film 22, the linear polarizing film 24, and the transparent filler 26 may be directly formed on the display layer 20 by coating. For example, the retardation film 22 may be formed on the display layer 20 first. Then the transparent filler 26 may be formed on a region corresponding to the photosensitive region of the retardation film 22 and the optical device 28. And then the linear polarizing film 24 may be formed on a surrounding region of the transparent filler 26. In addition, the transparent filler 26 may be highly flush with the linear polarizing film 24.

In some embodiments, the polarizer including the retardation film 22, the linear polarizing film 24, and the transparent filler 26 may be formed first. For example, the polarizer may be formed in the manner shown in FIG. 4 or FIG. 5, and the polarizer formed includes the base film in the above-mentioned embodiment. Then the polarizer is attached to the display layer 20 by bonding.

The above description is for the purpose of illustrating implementations of the present disclosure, but not to limit the scope of the present disclosure. Any equivalent structural or process transformation performed based on the drawings and the specification of the present disclosure, applied directly and indirectly in other related art, should be within the scope of the present disclosure.

What is claimed is:

1. A polarizer, comprising:
   a base film, having a side surface and defining a first region and a second region surrounding the first region on the side surface;
   a linear polarizing film, arranged on the side surface of the base film and covering the second region;
   a transparent filler, arranged in a same layer with the linear polarizing film and covering the first region; and
   a retardation film, covering a side of the linear polarizing film and a side of the transparent filler away from the base film;
   wherein the side surface of the base film at the first region is hydrophobic, and the side surface of the base film at the second region is hydrophilic, such that the linear polarizing film only covers the second region.

2. The polarizer according to claim 1, wherein the transparent filler and the retardation film are made of a same material.

3. The polarizer according to claim 1, wherein a contact angle of the side surface of the base film at the first region is substantially 100°-120°, such that the transparent filler is connected to the base film at the first region.

4. The polarizer according to claim 1, wherein an adhesive is arranged on the side surface of the base film at the first region and the transparent filler is connected to the base film at the first region via the adhesive.

5. The polarizer according to claim 1, wherein a material of the transparent filler is an adhesive, such that the transparent filler is prone to being connected to the base film at the first region.

6. The polarizer according to claim 1, further comprising:
   an anti-interference layer, arranged between the linear polarizing film and the retardation film.

7. The polarizer according to claim 6, wherein the transparent filler and the anti-interference layer are made of a same material.

8. The polarizer according to claim 1, wherein the retardation film comprises at least one of a ¼ wavelength retardation layer or a ½ wavelength retardation layer.

9. An electronic device, comprising:
   a display layer;
   a retardation film, arranged on a side of the display layer;
   a linear polarizing film, arranged on a side of the retardation film away from the display layer and defining an opening;
   a transparent filler, arranged in the opening; and
   an optical device, arranged on a side of the display layer opposite to the retardation film, a photosensitive region of the optical device corresponding to the opening;
   wherein the retardation film comprises at least one of a ¼ wavelength retardation layer or a ½ wavelength retardation layer.

10. The electronic device according to claim 9, wherein the transparent filler is substantially flush with the linear polarizing film.

11. The electronic device according to claim 9, further comprising:
    a cover plate, arranged on a side of the linear polarizing film away from the display layer; and
    a base film, arranged between the linear polarizing film and the cover plate.

12. The electronic device according to claim 9, wherein the transparent filler and the retardation film are made of a same material.

13. A method for preparing a polarizer according to claim 1, comprising:
   providing a base film having a side surface and defining a first region and a second region surrounding the first region on the side surface;
   forming a linear polarizing film, a transparent filler and a retardation film on a side of the base film, arranging the linear polarizing film on the side surface of the base film and covering the second region, arranging the transparent filler in a same layer with the linear polarizing film and covers the first region, and covering the retardation film on a side of the linear polarizing film and of the transparent filler away from the base film.

14. The method according to claim 13, wherein before the forming the linear polarizing film, the transparent filler and the retardation film on the side of the base film, the method further comprises:
   surface treating the side surface of the base film for making the side surface of the base film at the first region hydrophobic and the side surface of the base film at the second region hydrophilic.

15. The method according to claim 14, wherein the base film is a triacetate cellulose film, a surface of the base film is hydrophobic, and the surface treating the side surface of the base film for making the side surface of the base film at the first region hydrophobic and the side surface of the base film at the second region hydrophilic comprises:
   blocking the first region of the base film by a blocking member;
   processing the second region of the base film with a lye saponification treatment, a pure water cleaning treatment, and drying in sequence.

16. The method according to claim 14, wherein,
   the forming the linear polarizing film, the transparent filler and the retardation film on the side of the base film comprises:
   coating a linear polarizing material on the side surface of the base film, wherein the linear polarizing material is only attached to the side surface of the base film at the second region to form the linear polarizing film;
   coating a retardation material on the side of the base film to cover a side of the linear polarizing film away from the base film and covering the first region; wherein the retardation material covering the first region forms the transparent filler, and the retardation material covering a side of the linear polarizing film and of the transparent filler away from the base film forms the retardation film.

17. The method according to claim 16, wherein, before the coating the retardation material on the side of the base film, the method further comprises:
   treating the side surface of the base film at the first region such that a contact angle of the side surface of the base film at the first region is substantially 100°-120°; or,
   coating an adhesive on the side surface of the base film at the first region.

18. The method according to claim 13, wherein the forming the linear polarizing film, the transparent filler and the retardation film on the side of the base film comprises:
   arranging the transparent filler on the side surface of the base film, the transparent filler covering only the first region;
   arranging the linear polarizing film on the side surface of the base film, the linear polarizing film covering only the second region; and
   arranging the retardation film to cover a side of the linear polarizing film and of the transparent filler away from the base film.

* * * * *